(12) United States Patent
Holmes

(10) Patent No.: US 8,267,231 B2
(45) Date of Patent: Sep. 18, 2012

(54) ELECTRICALLY VARIABLE TRANSMISSION WITH AN AXIALLY-MOVEABLE SELECTABLE ONE-WAY CLUTCH ASSEMBLY

(75) Inventor: Alan G. Holmes, Clarkson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1076 days.

(21) Appl. No.: 12/188,362

(22) Filed: Aug. 8, 2008

(65) Prior Publication Data

US 2009/0084653 A1  Apr. 2, 2009

Related U.S. Application Data

(60) Provisional application No. 60/975,949, filed on Sep. 28, 2007.

(51) Int. Cl.
*F16D 41/16* (2006.01)
(52) U.S. Cl. ..................... 192/43.1; 192/69.1
(58) Field of Classification Search ............... 192/69.1, 192/85.18
See application file for complete search history.

(56) References Cited

U.S. PATENT DOCUMENTS

| 5,918,715 | A * | 7/1999 | Ruth et al. ................. 192/46 |
| 6,244,965 | B1 * | 6/2001 | Klecker et al. ............ 464/81 |
| 6,557,682 | B2 * | 5/2003 | Imamura ................. 192/48.5 |
| 6,568,517 | B2 * | 5/2003 | Le-Calve et al. ........... 192/46 |
| 7,721,860 | B2 * | 5/2010 | Saka ...................... 192/43.1 |
| 7,766,790 | B2 * | 8/2010 | Stevenson et al. .......... 477/8 |
| 2007/0199785 | A1 * | 8/2007 | Lane et al. ................ 192/42 |
| 2008/0110715 | A1 * | 5/2008 | Pawley ................... 192/43.1 |

* cited by examiner

*Primary Examiner* — David D Le
*Assistant Examiner* — Ryan Dodd
(74) *Attorney, Agent, or Firm* — Quinn Law Group, PLLC

(57) ABSTRACT

An electrically variable transmission (EVT) includes two shafts and a selectable one-way clutch (SOWC) having a first and second ring. The SOWC selectively connects the shafts, and is applied by moving the first ring and a blocking device in an axial direction into frictional contact with the second ring. A hydraulic piston applies the SOWC and a return spring releases it. The SOWC freewheels in both directions, or holds torque in one or both directions, depending on how the blocking device is rotated. A method for reducing losses in an EVT includes axially moving a second ring and blocking device of a SOWC into contact with a first ring, rotating the blocking device using frictional contact with the first ring, locking rotation of the first ring to apply the SOWC, and moving the second ring and blocking device an axial distance from the first ring to release the SOWC.

15 Claims, 5 Drawing Sheets

| MODE | TORQUE HOLDING | CLUTCH P | DIRECTIONAL CLUTCH SPEED |
|---|---|---|---|
| 1 | NONE/FREEWHEEL | OFF | N/A |
| 2A | REVERSE | ON | FORWARD |
| 2B | FORWARD | ON | REVERSE |
| 3 | TWO DIRECTIONS (LOCKED) | ON | NONE |
FIG. 3A
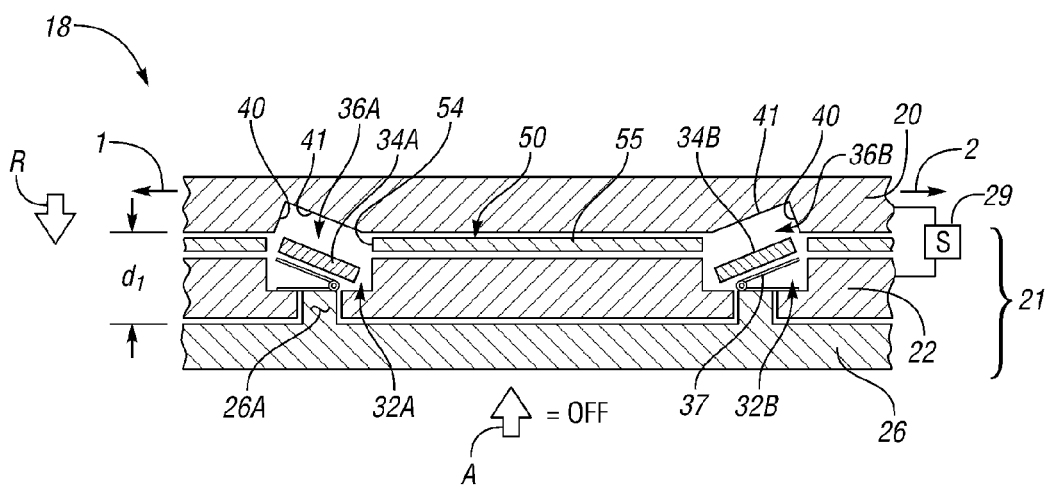
FIG. 3B
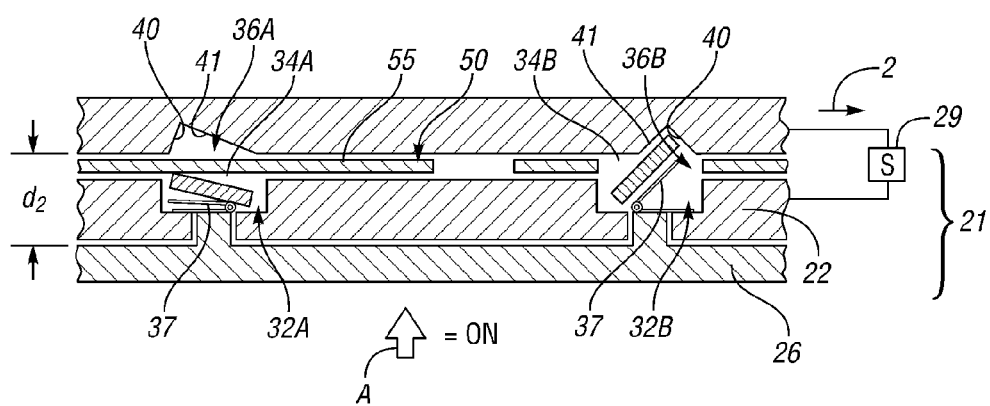
FIG. 3C

ELECTRICALLY VARIABLE TRANSMISSION WITH AN AXIALLY-MOVEABLE SELECTABLE ONE-WAY CLUTCH ASSEMBLY

CLAIM OF PRIORITY

This application claims priority to U.S. Provisional Patent Application No. 60/975,949, filed on Sep. 28, 2007, which is hereby incorporated by reference in its entirety.

TECHNICAL FIELD

The present invention relates generally to an electrically variable transmission (EVT) with a selectable one-way clutch (SOWC) assembly having an axially-moveable portion for establishing one of three different clutch operating states.

BACKGROUND OF THE INVENTION

An EVT utilizes differential gearing and one or two electric motor/generators, also referred to as "motors" for simplicity, to allow adjustment of a speed ratio of a transmission input over a transmission output. An EVT may be particularly useful in a hybrid electric vehicle when used in conjunction with an electric energy storage device, such as a battery. An EVT may be able to save fuel relative to certain conventional automatic transmissions, in part because the EVT uses the energy-conserving action of the electric motors rather than the energy-dissipating action of a hydraulic torque converter. Additionally, an EVT provides the ability to continuously vary a transmission ratio, as well as the ability to recover energy during a braking event or slowing of the vehicle and to store this captured energy within the energy storage device. Finally, an EVT can assist a smaller and generally more efficient engine in propelling the vehicle.

An EVT may have a single range, also referred to as a "mode", wherein the input speed, the output speed, and one or more motor speeds are a linear combination of one another. For example, the output speed may be one third of the sum of twice the speed of the input and the speed of one electric motor. Alternately, an EVT may have multiple ranges/modes to reduce the motor power required for adjusting the transmission speed ratio and a transmission or transfer of power from the input to the output.

The multiple ranges/modes described above are activated by the engagement of selectable torque-transmitting devices or clutches. For example, a two-mode EVT may have one range for high transmission speed ratios, which is activated by the engagement of one clutch, and another range for low transmission speed ratios, which is activated by engagement of another clutch. Since each of these ranges is continuously variable, the EVT may be designed so that shifting between the two ranges may be accomplished with the transmission operating at a particular speed ratio which is common to both ranges. Therefore, the shift event may be made synchronously, that is, with zero relative speed across the clutches during the shift event. The shift event is then simply a torque transfer between one clutch and another clutch without the necessity of slipping between the clutches, while the electric motors control the speed ratio through the transmission both before and after the shift event.

SUMMARY OF THE INVENTION

Accordingly, an EVT is constructed with a SOWC that is operable for connecting first and second members or shafts of the EVT. The SOWC has a pair of rings, and is actuated or applied by moving one ring in an axial direction to select between multiple ranges or SOWC operating modes. The different transmission operating modes achieved through selection of the different SOWC operating modes reduce the motor power required for adjusting the transmission speed ratio through the range required for optimal engine efficiency over a wide range of vehicle operating conditions. Multiple ranges are also useful for reducing the amount of mechanical energy from the engine that must be converted to electrical energy and back into mechanical energy, for reducing the losses which come from these conversions, and therefore for improving fuel economy if greater losses are not incurred from the devices necessary for operating in multiple ranges.

According to one embodiment, an electric motor can be connected to one or both of the first and second shafts to control a relative speed of the first and second rings. The SOWC includes a blocking device that moves through frictional contact with the first ring, with the blocking device at least partially determining a transition of the SOWC from a transmission of torque in one rotational direction to a transmission of torque in both rotational directions. The SOWC can be configured to include two sets of struts oriented in opposite directions, and the blocking device can include a plurality of windows aligned with respect to the struts to establish one of a plurality of different clutch operating modes, including holding torque in one, both, or neither rotational direction, depending one which set or sets of struts are blocked by the blocking device.

A SOWC is provided for use with an EVT, and includes a first and a second ring, a plurality of strut pieces each configured for holding torque in one of a first and a second rotational direction to establish one of a plurality of different clutch operating modes, and a blocking device. The blocking device has a plurality of windows, and moves through frictional contact with the second ring to align the windows. The SOWC is applied by moving the second ring in an axial direction with respect to an axis of rotation of the first ring and the second ring.

A method is also provided for reducing losses due to drag within an EVT. The method provides a SOWC having an axially-moveable second ring, a rotatable first ring, and an axially-moveable and selectively rotatable blocking device, and applies an apply force to the second ring to move the second ring into contact with the blocking device. The blocking device is then moved in an axial direction to establish frictional contact between the blocking device and the first ring. The frictional contact rotates the blocking device to align the blocking device and the first ring. The method includes locking the rotation of the first ring in at least one direction when the desired alignment is established, thus applying the SOWC, and releasing the SOWC by moving the second ring and the blocking device a predetermined axial distance away from the first ring.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3A is a table describing multiple clutch operating modes according to the invention;

FIG. 3B is a schematic fragmentary cross sectional side view of the SOWC of the invention in a first operating mode;

FIG. 3C is a schematic fragmentary cross sectional side view of the SOWC of FIGS. 2 and 3B in a second operating mode;

DESCRIPTION OF THE PREFERRED EMBODIMENTS

Figure 1:
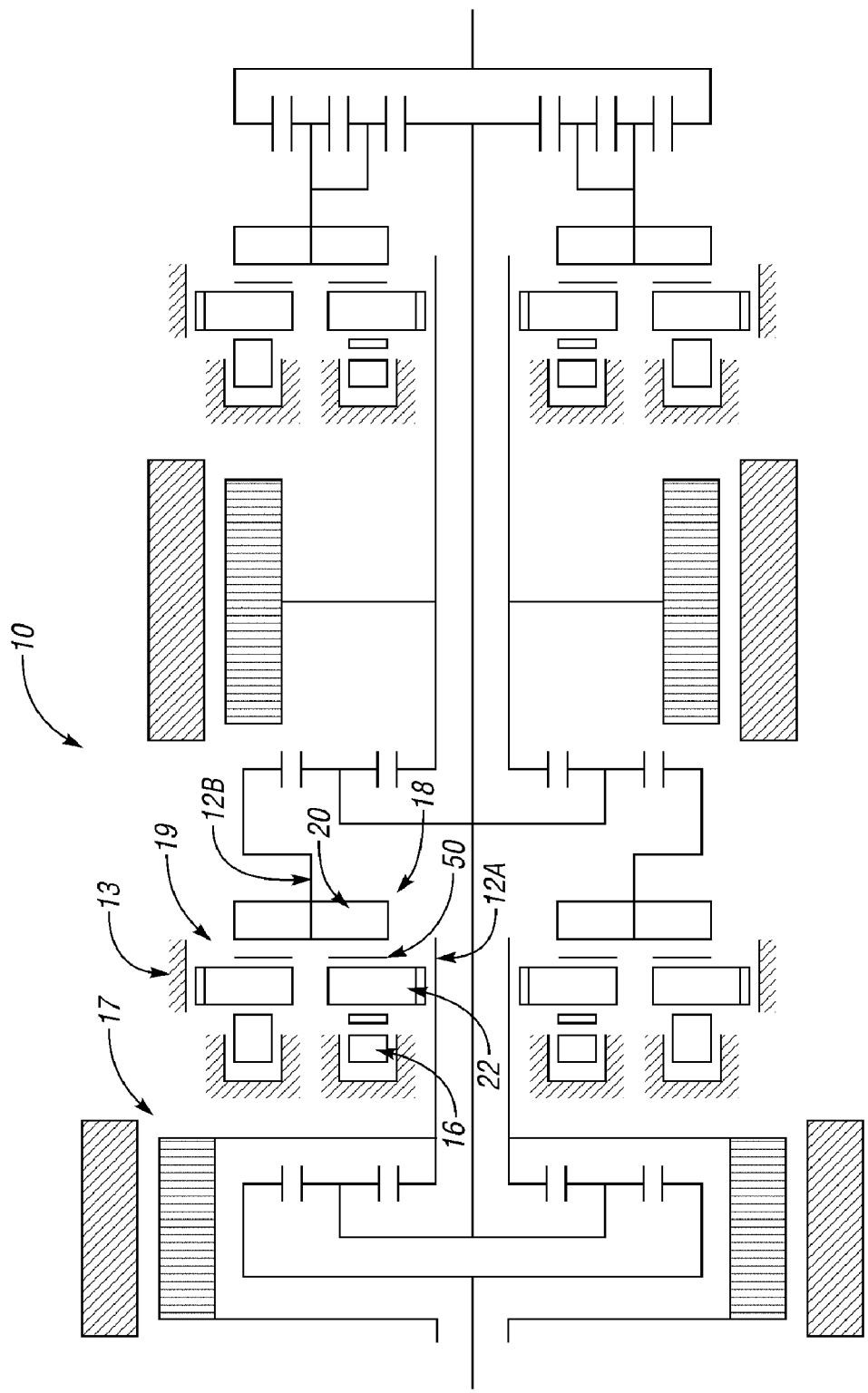
FIG. 1 is a schematic cross sectional view of an electrically-variable transmission (EVT) having a selectable one-way clutch (SOWC) according to the invention.

Referring to the drawings wherein like reference numbers correspond to like or similar components throughout the several figures, and beginning with FIG. 1, a transmission 10, shown in one embodiment as an electrically variable transmission (EVT), has a selectable one-way clutch 18, hereinafter referred to simply as the SOWC 18, with an axis of rotation 11 (see FIG. 2). The SOWC 18 is shown as a mechanical diode-type one-way clutch device, but it may also take the form of a sprag clutch, a roller clutch, or another style of one-way clutch within the scope of the invention. The transmission 10 has a stationary outer housing or case 13 that is constructed or cast from a ferrous or a nonferrous material, and within which the SOWC 18 is enclosed. The SOWC 18 includes a first race or ring 20, second race or ring 22, and a selector plate/ring or a blocking device 50, each of which will be described in detail below with reference to FIG. 2.

Figure 2:
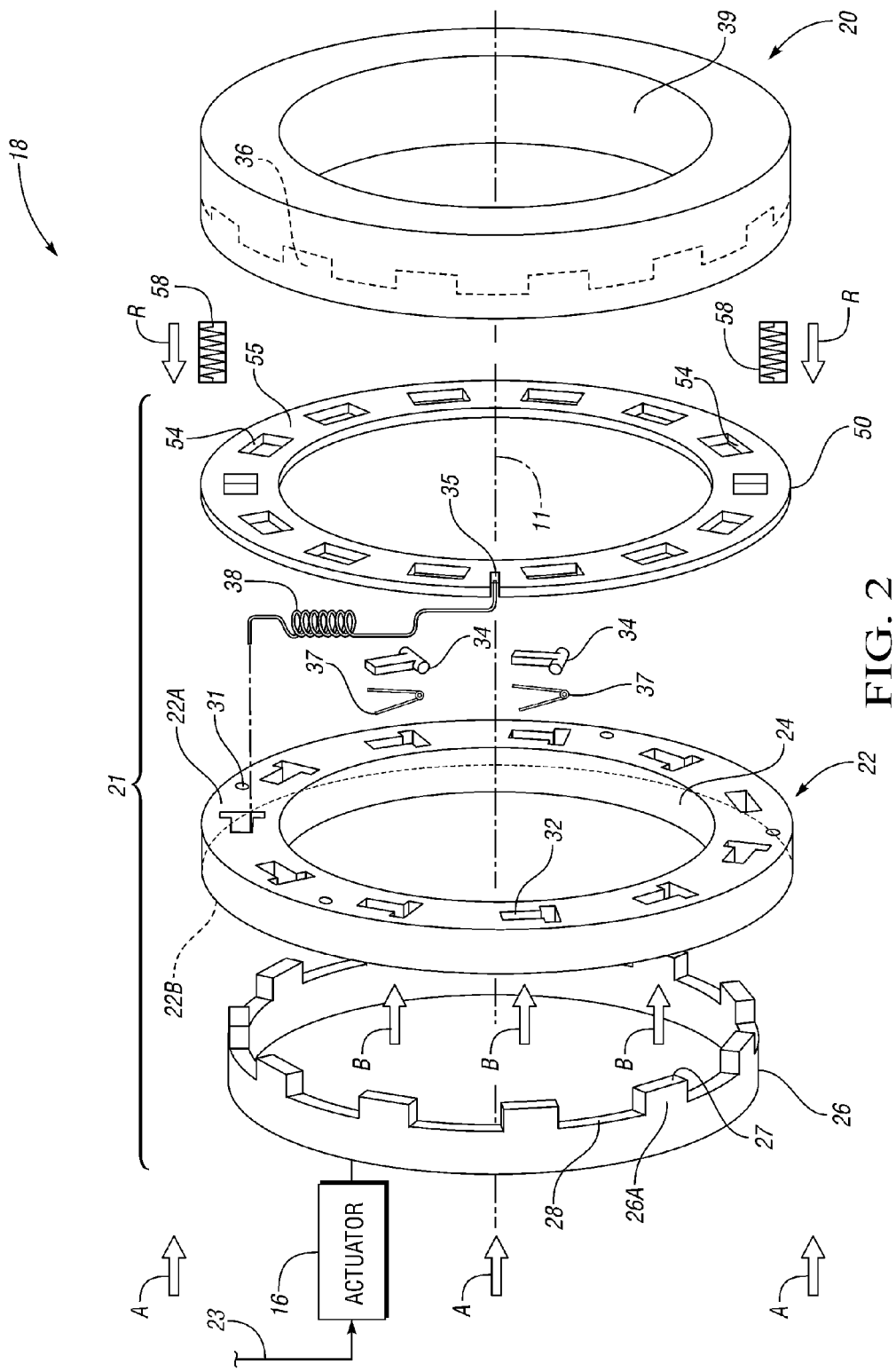
FIG. 2 is an exploded perspective side view of a SOWC usable with the EVT shown in FIG. 1.

The SOWC 18 also includes an actuator 16, such as a hydraulic apply piston or other hydraulically-actuated device, that is moveable in response to a force imparted by pressurized hydraulic fluid 23 (see FIG. 2). The fluid 23 of FIG. 2 may be delivered to the SOWC 18 by a pump (not shown) as needed through one or more fluid channels (not shown), as will be understood by those of ordinary skill in the art. The transmission 10 has a first rotatable shaft 12A that is connected to an electric motor/generator 17, and the transmission 10 further includes a second rotatable shaft 12B. The SOWC 18 is operable for transferring torque from a power source, such as an engine (not shown) and/or the electric motor/generator 17, to the drive wheels of a vehicle (not shown) by selectively transferring torque between the first and second rotatable shafts 12A and 12B, respectively, as needed, and/or between one of the rotatable shafts 12A, 12B and a stationary member of the transmission 10, such as the case 13.

In accordance with the invention, the transmission 10 may successfully shift gears using the SOWC 18 under all necessary operating conditions, including some random output torque fluctuations that may be caused by rough roads. The SOWC 18 does not cause significant drag and does not require a high-volume, high-pressure supply of oil for actuation in the manner of conventional wet plate clutches. Using the SOWC 18, therefore, the transmission 10 will gain a substantial further advantage by lowering the losses occurring within the transmission 10, thus optimizing fuel economy while reducing emissions.

A portion of the SOWC 18, such as the second ring 22, is splined or otherwise operatively connected to the first rotatable shaft 12A so that the second ring 22 is configured for or is capable of axial motion along the first rotatable shaft 12A. Another portion of the SOWC 18, such as the first ring 20, is splined to the second rotatable shaft 12B of the transmission 10, so that the first ring 20 resists axial motion. The SOWC 18 connects the first and second rotating shafts 12A, 12B, respectively, and so may be called a "rotating clutch", while an otherwise similarly configured clutch 19 connects the second rotating shaft 12B with the non-rotating case 13 or another stationary member, and so may be called a "stationary clutch".

Referring to FIG. 2 as one possible embodiment of the SOWC 18, the first ring 20 includes a circular central bore 39, and includes a plurality of radially-inward projecting teeth or splines (not shown) which are configured to engage or mate with slots or grooves of a rotatable body, such as the first rotatable shaft 12A, to thereby rotate in conjunction therewith. Likewise, the second ring 22 has a circular central bore 24 through which a rotatable and/or groundable hub portion (not shown) extends. To enable the transfer of torque from the first rotatable shaft 12A (see FIG. 1) to the second ring 22, the second ring 22 may be operatively connected to a reaction gear of a compound planetary gear set (not shown), or the hub portion (not shown) may be directly splined to the central bore 24, depending on the application, as will be understood by those of ordinary skill in the art.

The second ring 22 is shaped or configured to capture a plurality of torque-holding wedges, strut pieces, or struts 34 and a first ring 20 is shaped or configured to include a plurality of angled strut pockets 36 for receiving the struts 34, with two sets of the struts 34 and pockets 36 oriented differently in order to hold torque in a particular direction, as will be explained later hereinbelow. The blocking device 50 is positioned between the respective first and second rings 20 and 22, and is configured with a plurality of alternating windows 54 and blocking sections 55 arranged circumferentially around the blocking device 50. The alternating windows 54 and blocking sections 55 are positioned relative to the struts 34 so that by rotating the blocking device 50 relative to the second ring 22, all of the struts 34 that are oriented or facing in one direction or the other direction may be blocked or otherwise prevented from engaging the first ring 20.

An optional centering spring 38 is fitted between the second ring 22 and the blocking device 50 and is adapted for aligning each of the alternating windows 54 of the blocking device 50 with a different one of the struts 34. One end of the centering spring 38 may be press-fitted to the blocking device 50 through a mating hole 35 formed or bored therein, and at another end to the second ring 22 through a mating hole 31 formed or bored therein. The centering spring 38 is positioned or routed external to any interface formed between the second ring 22 and the blocking device 50 when the second ring 22 contacts the blocking device 50, as described in more detail below.

The second ring 22 is configured with a plurality of strut wells 32, which in the embodiment shown in FIG. 2 may be configured as through-openings through the second ring 22, i.e., from a front face 22A of the second ring 22 completely through to a rear face 22B of the second ring 22. Half of the strut wells 32 are oriented in one direction, and the remaining strut wells 32 are oriented or aligned in the opposite direction. In this manner, approximately half of the struts 34 are allowed to "lock" or engage with the angled strut pockets 36 of the first ring 20 at any given time to lock torque in a corresponding rotational direction. The different orientation of the struts 34 allows some struts 34 to be deployed in an axial direction (arrow A) while the remaining struts 34 are depressed by the blocking sections 55 of the blocking device 50, so that the rotation of the first ring 20 may be locked or held in one rotational direction or the other rotational.

The blocking device 50 has three effective positions relative to the second ring 22: a first position allowing those of the struts 34 that are oriented or facing in one common direction to engage the first ring 20 and lock it in one rotational direction relative to the second ring 22, a second position allowing those of the struts 34 that oriented or facing in the other common direction to engage the first ring 20 and lock it in the other rotational direction relative to the second ring 22, and a third position which may be assisted by the centering spring 38, the third position allowing all of the struts 34 of either orientation to engage the first ring 20 and lock it in both directions relative to the first ring 22, provided that the actuator 16 has moved the second ring 22 in close enough proximity to the first ring 20.

The SOWC 18 further includes the actuator 16 also shown in FIG. 1, such as a hydraulic apply piston responsive to pressurized hydraulic fluid 23, that may be operatively connected to or formed integrally with an apply ring 26. The second ring 22 and the blocking device 50 together make up an axially-moveable portion 21 of the SOWC 18, i.e., a portion of the SOWC 18 that is moveable in an axial direction in response to an apply force in the direction of arrow A. The apply ring 26 has a plurality of axially-projecting teeth 26A that are mutually spaced around a circumference of the apply ring 26. The teeth 26A have an upper surface 27, and are each separated by a lower surface or valley 28. As the strut wells 32 of the second ring 22 are through-openings as described above, i.e., they each extend axially through the second ring 22 from the front face 22A to the rear face 22B, movement of the apply ring 26 in the direction of arrow A allows the teeth 26A to enter a corresponding strut well 32 positioned adjacent thereto.

The axial movement of the apply ring 26 in response to an apply force in the direction of arrow A acts as a force on a strut spring 37 that is positioned in each of the strut wells 32 between the upper surface 27 of each tooth 26A and the strut 34. If this force acting on each of the strut springs 37 is not opposed by a blocking surface 55 of the blocking device 50 positioned between a strut 34 and a mating angled strut pocket 36 in the first ring 20, the spring force imparted by the strut spring 37 will force each strut 34 into a mating angled pocket 36 of the first ring 20. If this force is so opposed, the strut spring 37 will compress, providing a potential force for rapidly deploying the strut 34 when the blocking device 50 is again moved.

Once the blocking device 50 is placed in direct contact with the second ring 22, a continued application of force in the direction of arrow A will eventually move the blocking device 50 into contact with the first ring 20. Frictional forces imparted by the rotational motion of the first ring 20, and by any intervening fluid film from the pressurized hydraulic fluid 23 present between the first ring 20 and the blocking device 50, will tend to drag the blocking device 50 in the same rotational direction. This drag will ultimately position the blocking device 50 in such a manner as to cover one commonly oriented set of struts 34 with the blocking surfaces 55, and to free the other commonly oriented set of struts 34 to move or deploy through the windows 54 into the angled strut wells 36 of the first ring 20. That is, the blocking device 50 will rotate to cover the set of struts 34 oriented so as to immediately attempt to the lock the first ring 20 with respect to the second ring 22 as the struts 34 and the strut springs 37 are actuated by the apply ring 26.

A return mechanism 58 is provided within the SOWC 18, with the return mechanism 58 being configured as a spring or another suitable device providing a sufficient return force for moving the blocking device 50 and the second ring 22 in the direction of arrow R a sufficient distance for disengaging the struts 34 from the first ring 20. Therefore, when an apply force in the direction of arrow A is discontinued or removed, such as by temporarily interrupting a supply of pressurized hydraulic fluid 23 to the actuator 16, the return force in the direction of arrow R allows the SOWC 18 to disengage and to "freewheel" until engagement of the SOWC 18 in one or both directions is desired.

Figure 3D:
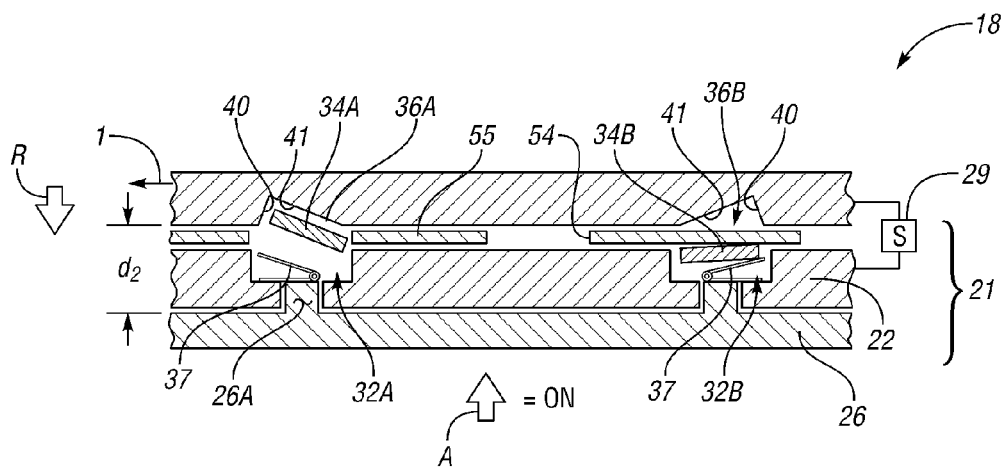
FIG. 3D is a schematic fragmentary cross sectional side view of the SOWC of FIGS. 2, 3B, and 3C showing a different aspect of the second operating mode of FIG. 3C.

Referring to FIG. 3A, various clutch operating modes are shown for the SOWC 18 (see FIGS. 1 and 2), with each mode defining a direction of torque holding with respect to the SOWC 18. In Mode 1, pressure to the actuator 16 (see FIG. 2) is turned off, and the SOWC 18 is allowed to "freewheel", i.e., torque is not held in either rotational direction. Mode 1 permits the first ring 20 to rotate or spin unimpeded with respect to the second ring 22. In Modes 2A and 3, pressure to the actuator 16 is turned on, and torque is locked or held in one rotational direction. Modes 2A and 2B are identical in operation, except for the direction in which torque is held. For example, in Mode 2A the first ring 20 may be permitted to freewheel or rotate unimpeded in a forward rotational direction, and to lock or be prevented from rotating in the reverse rotational direction, while Mode 2B would likewise permit the reverse rotation of the first ring 20, holding torque in the forward direction. Finally, in Mode 3 the SOWC 18 is locked, i.e., torque is held in both rotational directions. Each of the operating modes described generally above as applied to the SOWC 18 are shown in detail in the fragmentary cross-sectional side views of FIGS. 3B, 3C, and 3D, respectively.

In each of FIGS. 3B, 3C, and 3D, the angled strut pockets 36 of FIG. 2 are shown as the angled strut pockets 36A and 36B to differentiate their different torque-holding orientation. Each of the strut pockets 36A, 36B has a substantially vertical locking surface 40 and an angled surface 41. The struts 34 of FIG. 1 are represented by their respective orientation as 34A, 34B. The vertical locking surface 40 is configured and/or shaped to oppose a strut 34A, 34B as needed to thereby prevent rotation of the first ring 20 in one direction when either of Modes 2A, 2B, or 3 are selected (see FIG. 3A). Likewise, the sloped surface 41 is configured and/or shaped to allow a strut 34A, 34B to be depressed by the blocking device 50 into a mating strut well 32A, 32B to permit relative rotation of one of the respective first and second rings 20, 22 (see FIG. 2). When the SOWC 18 is locked in one direction and is transmitting torque, the separation of the ends of the struts 34 in the axial direction may create a force that tends to separate the first ring 20 from the second ring 22, so that upon the SOWC 18 locking in one direction, the friction force on the blocking device 50 is reduced, and the blocking device 50 is rotated by the centering spring 35 (see FIG. 2) into the center position shown in FIG. 3E. Alternately, the centering spring 35 may assist friction force on the blocking device 50 so that as the first ring 20 rotates slightly relative to the second ring 22 to lock via a commonly oriented set of the struts 34, the blocking device 50 also rotates slightly relative to the second ring 22, thus uncovering the other commonly oriented set of struts 34. In this position, all of the struts 34 are aligned with the windows 54 in the blocking device 50, and may therefore engage the first ring 20.

As shown in FIGS. 3B through 3E, a sensor (S) 29 can sense, detect, or otherwise determine the relative speed of the rings 20, 22 for use in controlling the SOWC 16. The second ring 22 may be rotating or grounded, such as to the stationary transmission housing or casing 13 (see FIG. 1), and first ring 20 is always allowed to rotate. The first ring 20 may be connected to motor/generator 17 (see FIG. 1), which is in communication with a motor controller (not shown) that is configured to synchronize the rotational speeds of the first and second rings 20, 22 to facilitate actuation of the SOWC 18. However, in the event the second ring 22 is not grounded and therefore is also rotating, the motor/generator 17 would be likewise connected to the second ring 22 and in communication with the controller (not shown), as will be understood by those of ordinary skill in the art.

In FIG. 3B, and representing Mode 1 or a "freewheeling" mode, the blocking device 50 is separated from the first ring 20 by the return mechanism 58 (see FIG. 2), thus forcing the struts 34 out of engagement with each respective mating strut pocket 36. The apply force represented by the arrow A, as shown also in FIG. 2, is zero or off, allowing the previously described return force (arrow R) to move or separate the blocking device 50 and the second ring 22 from the first ring 20. The initial distance of separation ($d_1$) is sufficient for ensuring that no portion of any of the struts 34A, 34B may contact the first ring 20. The SOWC 18 therefore freewheels in either direction, as represented by arrows 1 and 2.

Referring to FIG. 3C, which represents Mode 2A or torque-holding in a reverse direction, the apply pressure (arrow A) is turned on, thus forcing the apply ring 26 to move axially in the direction of arrow A. This moves the axially-moveable portion 21 of the SOWC 18, and the distance of separation ($d_2$) between the actuator ring 26 and the first ring 20 is less than the initial distance of separation ($d_1$) shown in FIG. 3B. The blocking device 50 blocks the struts 34A, with the strut springs 37 forcing any previously depressed strut 34B into engagement with the first ring 20. The struts 34B "lock" via interference with a vertical locking surface 40 of each angled strut well 36B into which the struts 34B are forced or moved. The orientation of the struts 34B within the angled strut wells 36B therefore ensures that torque is held or prevented in the reverse position by allowing the first ring 20 to rotate in the direction of arrow 2, but by preventing the first ring 20 from rotating in the direction of arrow 1 (see FIG. 3B).

Referring to FIG. 3D, which represents Mode 2B or torque-holding in a forward direction, the apply pressure (arrow A) remains on, still forcing the apply ring 26 to move in the direction of arrow A. The blocking device 50 blocks the struts 34B, with strut springs 37 forcing any previously depressed strut 34A into engagement with the first ring 20. The struts 34A "lock" via interference with a vertical locking surface 40 of each well 36A into which the struts 34A are forced or moved. The orientation of the struts 34A within the wells 36B therefore ensures that torque is held or prevented in the reverse position by preventing the first ring 20 from rotating in the direction of arrow 2.

Figure 3E:
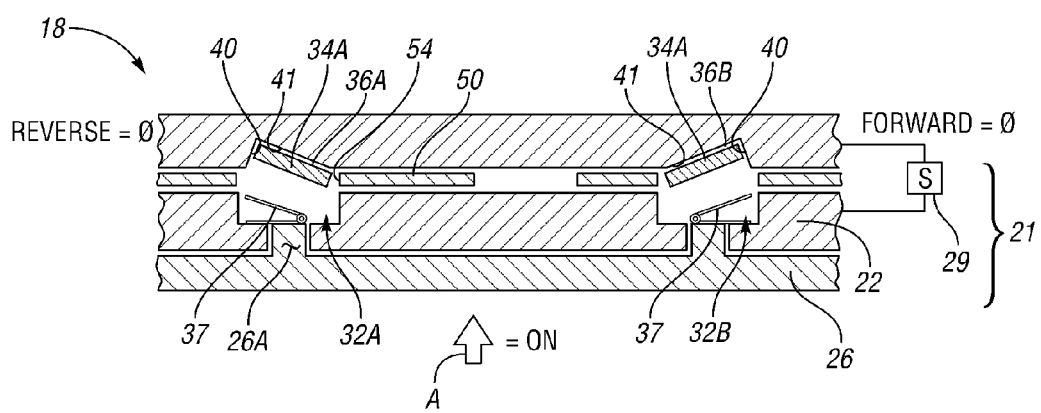
FIG. 3E is a schematic fragmentary cross sectional side view of the SOWC of FIGS. 2, 3B, 3C, and 3D in a third operating mode.

Turning to FIG. 3E, which represents Mode 3 or torque-holding in both rotational directions, the apply pressure (arrow A) remains on, still forcing the apply ring 26 to move in the direction of arrow A. The SOWC 18 stops, with zero relative motion between the inner and second rings 20 and 22, respectively. Drag on the blocking device 50 therefore disappears. Absent such drag forces, the centering ring 38 (see FIG. 2) is allowed to force or pull the blocking device 50 into a desired alignment with the second ring 22, with the strut springs 37 allowed to move any previously depressed struts 34A, 34B into engagement with the first ring 20. The struts 34A and 34B therefore "lock" the torque via interference with a vertical locking surface 40 of each well 36A, 36B into which the struts 34A, 34B are respectively forced or moved. The orientation of the struts 34A, 34B within the angled strut wells 36A, 36B therefore ensures that torque is held or prevented in both the forward and reverse positions by preventing the first ring 20 from rotating in the direction of arrows 1 and 2 (see FIG. 3B).

Figure 4A:
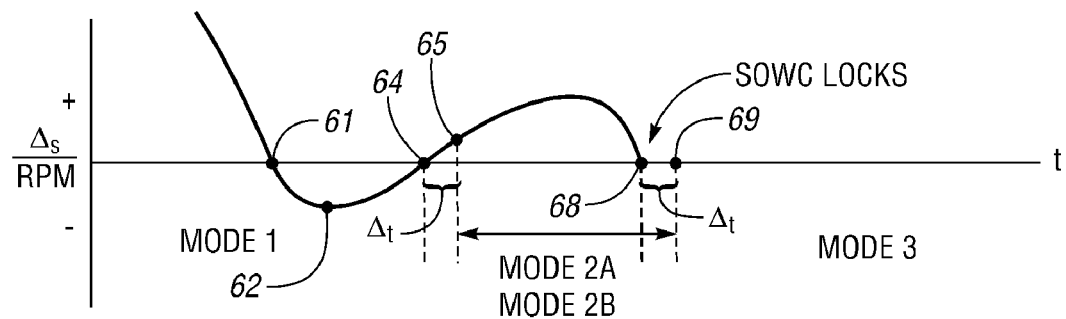
FIG. 4A is a graphical illustration of differential clutch speed versus clutch operating mode during an application of the SOWC shown in FIG. 2.

As shown in FIG. 4A, while in Mode 1, i.e., "freewheeling", in order to apply the SOWC 18, a controller (not shown) cycles or synchronizes the first and second rings 20, 22, respectively, so that a differential speed $\Delta_S$ therebetween approaches approximately zero revolution per minute, as represented by the point 61. A signal communicated at point 61 precipitates a change from Mode 1 to Mode 2 when a speed sensor (not shown) detects that the direction of $\Delta_S$, which changes at point 62, reaches a non-negative quantity, i.e., at point 64, at which point the SOWC 18 of FIG. 2 is "shifted" or changed to either of Mode 2A or Mode 2B, depending on the rotational direction of first ring 20, and thus holding torque in the respective reverse or forward rotational direction.

Because of the inherent time delay in making a physical shift by movement of the blocking device plate 50 (see FIGS. 2 and 3B through 3E), a slight time lag $\Delta t$ occurs before Mode 2 is fully realized at point 65. While the direction of $\Delta_S$ is positive, the SOWC 18 continues freewheeling. While in Mode 2, when the direction of $\Delta_S$ turns negative, i.e., at point 68, the clutch 18 locks. When the speed sensor (not shown) detects zero differential clutch speed and zero speed change, the SOWC 18 changes to Mode 3 so that rotational motion is prevented in both directions, as shown in FIG. 2D, thereby freeing or releasing the electric motor/generator 17 (see FIG. 1) to change speeds as necessary. Because of the time delay in making the physical shift by actuation of the blocking device 50, a slight time lag $\Delta t$ occurs before Mode 3 is fully realized at point 69.

Figure 4B:
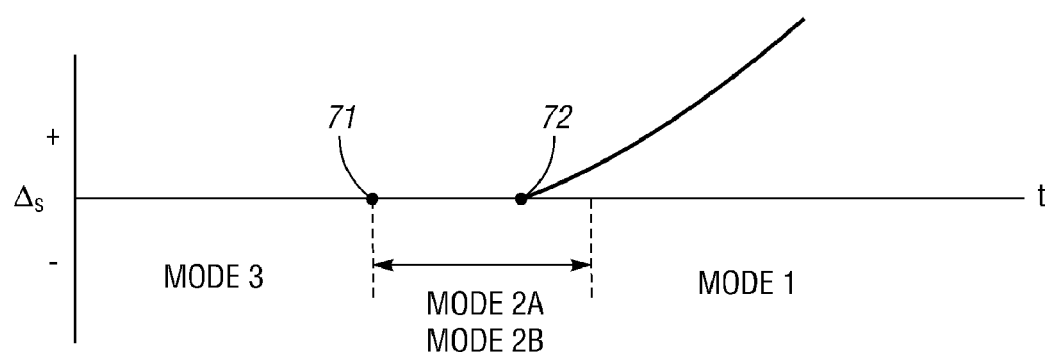
FIG. 4B is a graphical illustration of differential clutch speed versus clutch operating mode during a release of the SOWC shown in FIG. 2.

Referring to FIG. 4B, a similar speed curve is shown describing the release of the SOWC 18, beginning with dual-directional torque holding of Mode 3. To initiate a release of the SOWC 18, a mode change is signaled from Mode 3 to Mode 2 at point 71. Prior to a mode change to Mode 2, the SOWC 18 is momentarily loaded in the direction opposite that of the impending clutch release in the opposite direction, and then in Mode 2A or 2B, the clutch 18 is unloaded so that the SOWC 18 may be easily released. When the speed sensor (not shown) detects that the quantity $\Delta_S$ is positive, the operating mode is changed to "freewheel in both directions", i.e., Mode 1 at point 72, which is the initial state of FIG. 4A as previously described hereinabove.

While the best modes for carrying out the invention have been described in detail, those familiar with the art to which this invention relates will recognize various alternative designs and embodiments for practicing the invention within the scope of the appended claims.

The invention claimed is:
1. A transmission comprising:
   a first shaft;
   a second shaft;
   a selectable one-way clutch (SOWC) having:
      an axis of rotation;
      an actuator;
      a plurality of strut pieces each biased by a strut spring;
      a first ring connected to the first shaft that defines a plurality of strut pockets;
      an apply ring movable along the axis of rotation by the actuator, and having a plurality of axially-projecting teeth;

an axially-moveable second ring that is connected to the second shaft and that defines a plurality of strut wells extending axially through the second ring as through-openings, wherein each of the teeth is disposed in a respective one of the strut wells; and a rotatable blocking device positioned between the first ring and the second ring; and an electric motor connected to at least one of the first shaft and the second shaft;

wherein:

the electric motor is operable for controlling a relative speed between the first ring and the second ring of the SOWC;

the actuator moves the apply ring axially toward the second ring and moves the teeth toward the first ring into contact with the strut springs; and the blocking device is rotated about the axis of rotation by friction forces occurring during a rotation of the first ring to thereby block some, all, or none of the strut pieces and thereby select a particular mode of the SOWC.

2. The transmission of claim 1, wherein the SOWC is applied by moving the apply ring in an axial direction with respect to the axis of rotation toward the first ring until the second ring is locked to the first ring via some of the struts.

3. The transmission of claim 2, wherein the blocking device rotates through frictional contact with the first ring, the blocking device at least partially determining a transition of the SOWC from a transmission of torque in one rotational direction to a transmission of torque in both rotational directions.

4. The transmission of claim 3, wherein the blocking ring includes a plurality of windows, and wherein the rotation of the blocking device through frictional contact aligns the plurality of windows with respect to the plurality of strut pieces in a predetermined manner for establishing one of a plurality of different clutch operating modes, including a first operating mode comprising a freewheeling of the SOWC in both of the rotational directions, a second operating mode comprising a holding of torque in one rotational direction, and a third operating mode for holding torque in both rotational directions.

5. The transmission of claim 1, wherein the actuator moves along an axis that is parallel to the axis of rotation, the transmission further comprising a return mechanism operable for applying a return force on the blocking device and the second ring to disengage the struts from the first ring;

wherein the SOWC is actuatable using the actuator and is releasable using the return spring mechanism.

6. The transmission of claim 5, wherein the actuator is a hydraulic piston.

7. A selectable one-way clutch (SOWC) for use with a vehicle transmission, the SOWC comprising:

a first ring;

a second ring that defines strut wells extending axially through the second ring as through-openings;

an actuator;

an apply ring that is selectively moved by the actuator in an axial direction with respect to an axis of rotation of the SOWC, wherein the apply ring has a plurality of axially-projecting teeth each disposed within a respective one of the strut wells;

a plurality of strut pieces each configured for holding torque in one of a first and a second rotational direction to establish one of a plurality of different clutch operating modes; and a blocking device having a plurality of windows, the blocking device being configured for moving through frictional contact with the first ring to thereby align the plurality of windows in a predetermined manner for establishing one of the plurality of different clutch operating modes;

wherein:

the SOWC is applied by moving the apply ring via the actuator toward the second ring in an axial direction with respect to the axis of rotation until the teeth press on a strut spring of the strut pieces in a direction that is toward the fist ring; and the blocking device is rotated about the axis of rotation by a rotation of the first ring to thereby block some, all, or none of the strut pieces and thereby select a particular mode of the SOWC.

8. The SOWC of claim 7, wherein the plurality of different clutch operating modes includes a freewheeling of the SOWC in two rotational directions, a holding of torque in one rotational direction, and a holding of torque in both rotational directions.

9. The SOWC of claim 7, further comprising a centering spring that is fitted between the second ring and the blocking device;

wherein the centering spring aligns each of the plurality of windows of the blocking device with a different one of the plurality of strut pieces.

10. The SOWC of claim 7, wherein the actuator is a hydraulic piston that moves the second ring in the axial direction with respect to the axis of rotation.

11. The SOWC of claim 7, wherein half of the plurality of strut pieces and strut wells are oriented, with respect to a surface of the second ring, opposite the orientation of other half of the plurality of strut pieces and strut wells for holding torque in the respective first and second rotational directions.

12. A method for reducing losses due to clutch drag within a vehicle transmission, the method comprising:

providing a selectable one-way clutch (SOWC) having a rotatable first ring defining strut pockets, a plurality of strut pieces, an axially moveable second ring having strut wells formed entirely through the second ring, an apply ring having a plurality of axially-projecting teeth disposed in the strut wells, and an axially moveable and selectively rotatable blocking device;

generating an apply force via an actuator along an axis that is parallel to the axis of rotation of the SOWC;

applying the axial apply force to the apply ring to move the second ring along the axis of rotation and into contact with the blocking device, and to move the teeth in the strut wells toward the first ring;

moving the blocking device in the axial direction via contact between the blocking device and the second ring to establish a frictional contact between the blocking device and the first ring;

rotating the blocking device using the frictional contact with the first ring via rotation of the first ring to thereby establish a desired alignment between the blocking device and the first ring;

preventing a rotation of the first ring in at least one direction when the desired alignment is established by moving some of the strut pieces via the teeth into some of the strut pockets of the first ring, thereby applying the SOWC; and moving the second ring and the blocking device a predetermined axial distance away from the first ring to thereby release the SOWC.

13. The method of claim 12, wherein moving the second ring and the blocking device includes applying a return force to the second ring while reducing the apply force a sufficient level below a level of the return force.

14. The method of claim 12, wherein applying the SOWC includes blocking half of the plurality of strut pieces using the blocking device.

15. The method of claim 12, wherein applying the axial apply force includes using a hydraulic piston to move the apply ring axially with respect to the axis of rotation into contact with the second ring.

* * * * *